(12) United States Patent
Hyun et al.

(10) Patent No.: US 10,639,652 B2
(45) Date of Patent: May 5, 2020

(54) DUST COLLECTOR AND CLEANER HAVING THE SAME

(71) Applicant: LG ELECTRONICS INC., Seoul (KR)

(72) Inventors: Kietak Hyun, Seoul (KR); Sangchul Lee, Seoul (KR); Changgun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 251 days.

(21) Appl. No.: 15/941,388

(22) Filed: Mar. 30, 2018

(65) Prior Publication Data

US 2019/0091703 A1    Mar. 28, 2019

(30) Foreign Application Priority Data

Sep. 22, 2017    (KR) .................. 10-2017-0122606

(51) Int. Cl.
  *B01D 45/12*    (2006.01)
  *B01D 45/16*    (2006.01)
  (Continued)

(52) U.S. Cl.
  CPC .................. *B04C 7/00* (2013.01); *A47L 9/16* (2013.01); *A47L 9/165* (2013.01); *A47L 9/1608* (2013.01);
  (Continued)

(58) Field of Classification Search
  CPC ........... B01D 45/12; B01D 45/16; A47L 9/16; B04C 3/04
  (Continued)

(56) References Cited

U.S. PATENT DOCUMENTS

| 2,553,175 A | 5/1951 | Davenport |
| 3,074,218 A | 1/1963 | O'Dell |

(Continued)

FOREIGN PATENT DOCUMENTS

| KR | 10-0844621 | 7/2008 |
| KR | 10-2010-0093446 | 8/2010 |

(Continued)

OTHER PUBLICATIONS

PCT International Search Report dated Feb. 22, 2018 issued in Application No. PCT/KR2017/011379.

(Continued)

*Primary Examiner* — Robert A Hopkins
(74) *Attorney, Agent, or Firm* — KED & Associates, LLP

(57) ABSTRACT

A dust collector includes a cylindrical housing forming an outer appearance of the dust collector; a cyclone inside the housing to cause a swirling flow to separate dust from air introduced into the housing; axial inlet type swirl tubes receiving air and fine dust that have passed through the cyclone, and causing a swirling flow to separate the fine dust from the air; and a mesh surrounding an outside of the axial inlet type swirl tubes to form a boundary between the cyclone and the axial inlet type swirl tubes, wherein the axial inlet type swirl tubes are stacked in stages and the axial inlet type swirl tubes in each stage are arranged in first and second columns that are provided in opposite directions to each other, and axial lengths of the axial inlet type swirl tubes gradually increase toward the center of each stage.

20 Claims, 7 Drawing Sheets

(51) Int. Cl.
  *A47L 9/16* (2006.01)
  *B04C 3/04* (2006.01)
  *B04C 7/00* (2006.01)
  *B04C 3/06* (2006.01)
  *B04C 5/04* (2006.01)
  *B04C 9/00* (2006.01)
  *B01D 50/00* (2006.01)

(52) U.S. Cl.
  CPC ........... *A47L 9/1616* (2013.01); *A47L 9/1625* (2013.01); *A47L 9/1641* (2013.01); *A47L 9/1683* (2013.01); *B01D 45/12* (2013.01); *B01D 45/16* (2013.01); *B01D 50/002* (2013.01); *B04C 3/04* (2013.01); *B04C 3/06* (2013.01); *B04C 5/04* (2013.01); *B04C 9/00* (2013.01); *B04C 2009/002* (2013.01)

(58) Field of Classification Search
  USPC .................. 55/345, 456, 457, 346, 347, 348
  See application file for complete search history.

(56) References Cited

U.S. PATENT DOCUMENTS

| | | | |
|---|---|---|---|
| 3,375,058 | A | 3/1968 | Petersen |
| 3,386,588 | A | 6/1968 | Ades |
| 3,425,192 | A | 2/1969 | Davis |
| 3,541,766 | A | 11/1970 | Wilson |
| 3,747,306 | A | 7/1973 | Wikdahl |
| 3,915,679 | A | 10/1975 | Roach |
| 4,537,608 | A | 8/1985 | Koslow |
| 4,702,846 | A | 10/1987 | Ryynanen |
| 5,129,124 | A | 7/1992 | Gamou |
| 5,403,367 | A | 4/1995 | De Villiers |
| 5,681,450 | A | 10/1997 | Chitnis |
| 7,462,212 | B2 | 12/2008 | Han |
| 7,655,058 | B2 | 2/2010 | Smith |
| 7,770,256 | B1 * | 8/2010 | Fester ................ A47L 9/1683 15/353 |
| 7,799,106 | B2 | 9/2010 | Rother |
| 7,803,205 | B2 | 9/2010 | Oh |
| 7,976,597 | B2 | 7/2011 | Smith |
| 8,101,001 | B2 | 1/2012 | Qian |
| 8,262,761 | B2 | 9/2012 | Babb |
| 8,657,904 | B2 | 2/2014 | Smith |
| 8,914,941 | B2 | 12/2014 | Kim |
| 2003/0057151 | A1 | 3/2003 | Kopec |
| 2007/0234691 | A1 | 10/2007 | Han |
| 2008/0190080 | A1 | 8/2008 | Oh |
| 2009/0031524 | A1 | 2/2009 | Courtney |
| 2009/0265883 | A1 | 10/2009 | Reed |
| 2010/0005617 | A1 | 1/2010 | Hyun et al. |
| 2010/0115727 | A1 | 5/2010 | Oh |
| 2010/0275561 | A1 | 11/2010 | Lundquist |
| 2013/0031878 | A1 | 2/2013 | Menssen |
| 2013/0255203 | A1 | 10/2013 | Muenkel |
| 2014/0373490 | A1 | 12/2014 | Wuebbeling |
| 2016/0088988 | A1 | 3/2016 | Eo |
| 2017/0247896 | A1 | 8/2017 | Hayes |

FOREIGN PATENT DOCUMENTS

| | | |
|---|---|---|
| KR | 10-2015-0031304 | 3/2015 |
| KR | 10-2015-0109045 | 10/2015 |
| KR | 10-2016-0089201 | 7/2016 |

OTHER PUBLICATIONS

PCT International Search Report dated Feb. 22, 2018 issued in Application No. PCT/KR2017/011380.
PCT International Search Report dated Feb. 22, 2018 issued in Application No. PCT/KR2017/011381.
PCT International Search Report dated Feb. 22, 2018 issued in Application No. PCT/KR2017/011382.
United States Office Action dated Jan. 6, 2020 issued in U.S. Appl. No. 15/941,181.
United States Notice of Allowance dated Jan. 6, 2020 issued in U.S. Appl. No. 15/940,373.

* cited by examiner

DUST COLLECTOR AND CLEANER HAVING THE SAME

CROSS-REFERENCE TO RELATED APPLICATION

This application claims priority under 35 U.S.C. § 119 to Korean Application No. 10-2017-0122606, filed on Sep. 22, 2017, whose entire disclosure is hereby incorporated by reference.

BACKGROUND

1. Field

The present disclosure relates to a vacuum cleaner for sucking air and dust using a suction force, separating dust from the sucked air to collect dust, and discharging only clean air, and a dust collector provided in the vacuum cleaner.

2. Background

A vacuum cleaner refers to a device for sucking dust and air using a suction force generated by a suction motor mounted inside a cleaner body, and separating and collecting dust from the air.

Such vacuum cleaners are classified into a canister cleaner, an upright cleaner, a stick cleaner, a handy cleaner, and a robot cleaner. In case of the canister cleaner, a suction nozzle for suctioning dust is provided separately from a cleaner body, and the cleaner body and the suction nozzle are connected to each other by a connecting device. In case of the upright cleaner, the suction nozzle is rotatably connected to the cleaner body. In case of the stick cleaner and the handy cleaner, a user uses the cleaner body while holding it with his or her hand. However, in case of the stick cleaner, the suction motor is provided close to the suction nozzle (lower center), and in case of the handy vacuum cleaner, the suction motor is provided close to a grip portion (upper center). The robot cleaner performs cleaning by itself while traveling through an autonomous driving system.

There are currently disclosed many vacuum cleaners employing a multi-cyclone. Cyclone refers to a device for forming a swirling flow in a fluid and separating air and dust from each other using a centrifugal force difference resulting from a weight difference between the air and the dust. The term "multi-cyclone" refers to a structure for separating air and dust from each other using a primary cyclone, and separating air and fine dust from each other using a plurality of secondary cyclones. Here, dust and fine dust are classified by size.

For example, Korean Patent Laid-Open Publication No. 10-2015-0031304 (published on Mar. 23, 2015) discloses a cleaning device employing a multi-cyclone. The dust and fine dust which are introduced into an inside of the body along with the air are sequentially separated from the air by the primary cyclone and the secondary cyclones. A vacuum cleaner employing a cyclone has an advantage of not requiring a separate replaceable dust bag.

A cone structure is formed particularly in a body (cylinder) of a secondary cyclone in a multi-cyclone. The cone denotes a shape in which a cross-sectional area of the secondary cyclone becomes smaller toward one side. The air and fine dust introduced into the secondary cyclone are separated from each other in the secondary cyclone. The fine dust is discharged to a fine dust outlet along the cone, and the air is discharged to an air outlet formed in a direction opposite to an outlet of the fine dust.

Such a structure has a problem of causing flow loss. As a flow direction of the air changes frequently, flow loss occurs because an inlet of the secondary cyclone and the air outlet are formed on the same side with each other. The air is introduced into the inlet of the secondary cyclone, changes its direction within the secondary cyclone, and discharged again to the air outlet, thereby causing flow loss during the process.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements, and wherein.

DETAILED DESCRIPTION

Figure 1:
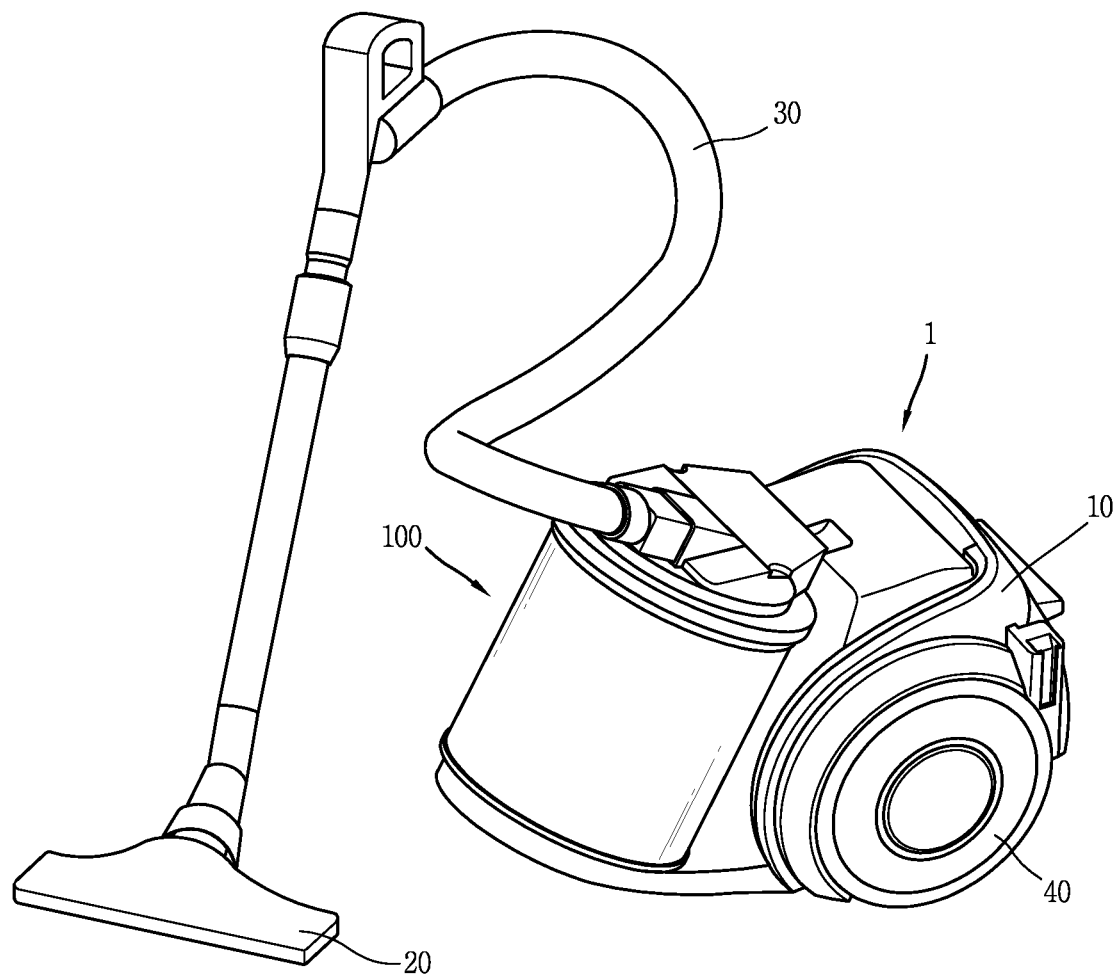
FIG. 1 is a perspective view illustrating an example of a vacuum cleaner associated with the present disclosure.

Hereinafter, a dust collector associated with the present disclosure will be described in more detail with reference to the accompanying drawings. Even in different embodiments according to the present disclosure, the same or similar reference numerals are designated to the same or similar configurations, and the description thereof will be substituted by the earlier description. Unless clearly used otherwise, expressions in the singular number used in the present disclosure may include a plural meaning.

For reference, a dust collector 100 applied to a canister-type vacuum cleaner 1 is illustrated in the present drawing, but the dust collector 100 of the present disclosure is not necessarily limited to the canister-type vacuum cleaner 1. For example, the dust collector 100 of the present disclosure may also be applicable to an upright type vacuum cleaner, and the dust collector may be applicable to all types of vacuum cleaners.

FIG. 1 is a perspective view illustrating an example of a vacuum cleaner 1 associated with the present disclosure. Referring to FIG. 1, the vacuum cleaner 1 includes a cleaner body 10, a suction nozzle (or suction head) 20, a connecting unit (or hose) 30, a wheel unit (or wheel) 40, and a dust collector 100.

The cleaner body 10 has a suction unit (not shown) for generating a suction force. The suction unit includes a suction motor and a suction fan rotated by the suction motor to generate a suction force.

The suction nozzle 20 is configured to suck air and foreign substances adjacent to the suction nozzle 20. Here, foreign substances have a concept referring to substances other than air, and including dust, fine dust, and ultra-fine dust. Dust, fine dust, and ultra-fine dust are classified by size, and fine dust is smaller than dust and larger than ultra-fine dust.

The connecting unit 30 is connected to the suction nozzle 20 and the dust collector 100, respectively, to transfer air containing foreign matter, dust, fine dust, ultra-fine dust, and the like, sucked through the suction nozzle 20, to the dust collector 100. The connecting unit 30 may be configured in the form of a hose or pipe.

The wheel unit 40 is rotatably coupled to the cleaner body 10 to move or rotate the cleaner body 10 in every direction. For an example, the wheel unit 40 may include main wheels and an auxiliary wheel. The main wheels may be respectively provided on both sides of the cleaner body 10, and the auxiliary wheel may be configured to support the main body 10 together with the main wheels, and assist the movement of the cleaner body 10 by the main wheels.

In the present disclosure, the suction nozzle 20, the connecting unit 30, and the wheel unit 40 may be applicable to a vacuum cleaner in the related art as they are, and thus the detailed description thereof will be omitted.

The dust collector 100 is detachably coupled to the cleaner body 10. The dust collector 100 is configured to separate and collect foreign matter from air sucked through the suction nozzle 20, and discharge the filtered air.

The vacuum cleaner in the related art has a structure in which the connecting unit is connected to the suction unit formed in the cleaner body, and air suctioned through a flow guide extended from the suction unit to the dust collector is introduced back into the dust collector. The sucked air is introduced into the dust collector by a suction force of the suction unit. However, there is a problem that the suction force is reduced while passing through the flow guide of the vacuum cleaner body.

On the contrary, in the vacuum cleaner 1 of the present disclosure, the connecting unit 30 is directly connected to the dust collector 100 as illustrated in the drawing. According to such a connection structure, air sucked through the suction nozzle 20 flows directly into the dust collector 100 to enhance the suction force compared to the related art. Furthermore, there is an advantage of not requiring the formation of a flow guide inside the cleaner body 10.

In addition, the secondary cyclone in which a cone structure is formed in the body (cylinder) causes flow loss. Hereinafter, the dust collector 100 having an axial inlet type swirl tube to suppress the flow loss of the secondary cyclone will be described.

Figure 2:
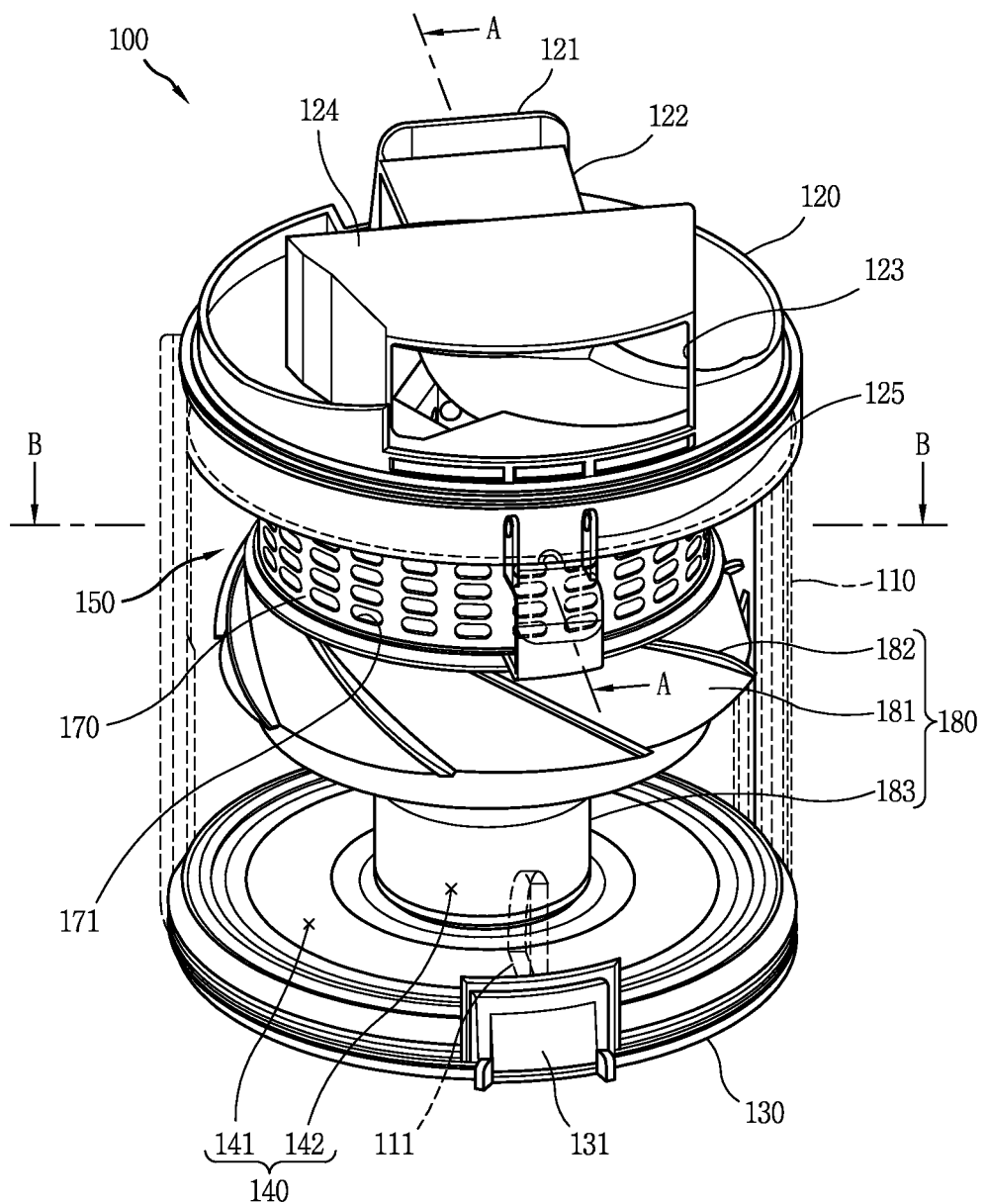
FIG. 2 is a perspective view of the dust collector illustrated in FIG. 1.
Figure 3:
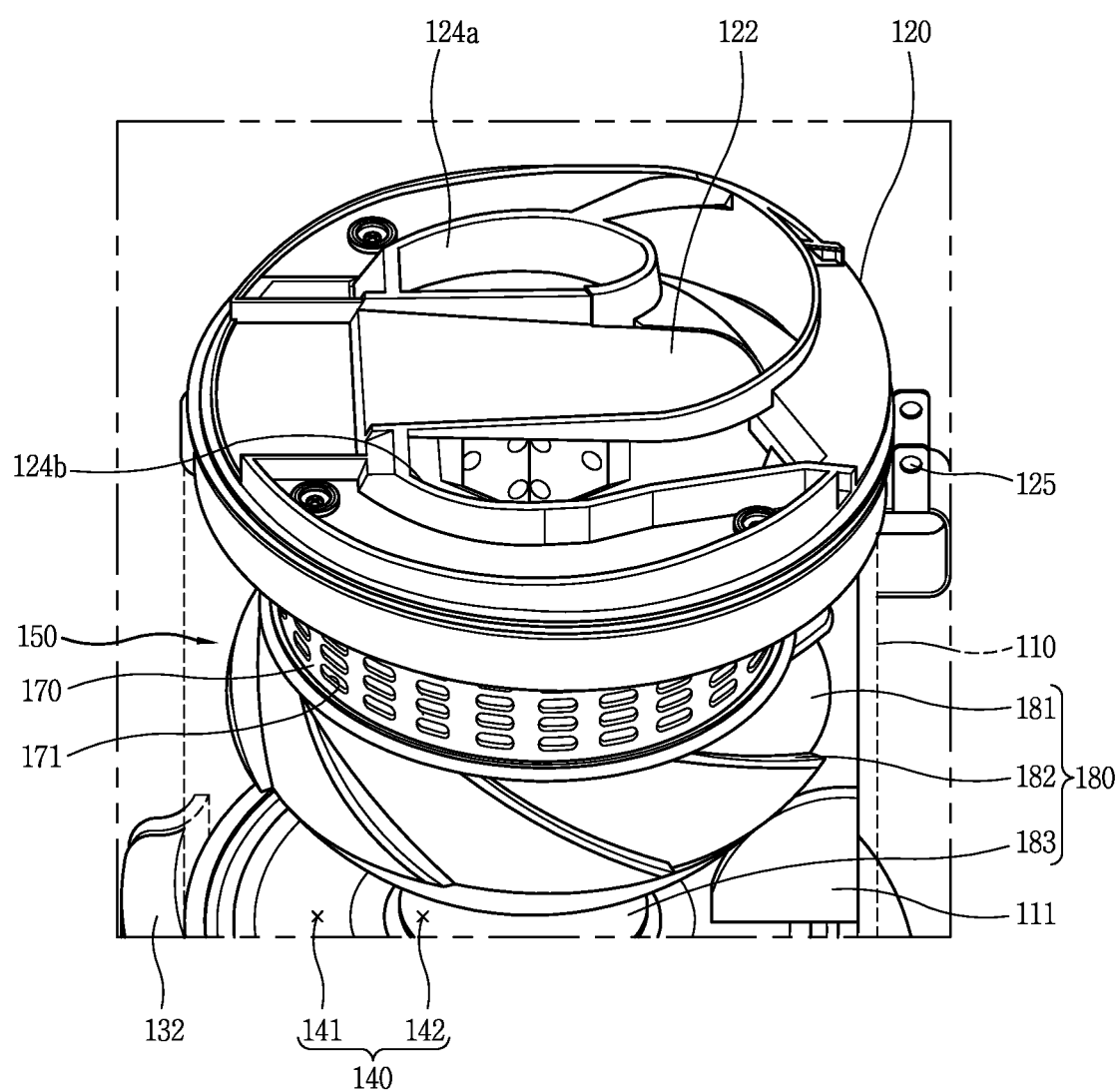
FIG. 3 is a perspective view illustrating a shape in which an upper portion of the dust collector illustrated in FIG. 2 is cut.

FIG. 2 is a perspective view of the dust collector 100 illustrated in FIG. 2. FIG. 3 is a perspective view illustrating a shape in which an upper portion of the dust collector 100 illustrated in FIG. 2 is cut. The dust collector 100 refers to a device for separating and collecting foreign matter (dust, fine dust, ultra-fine dust, etc.) from air sucked through the suction nozzle 20. The air flows along a flow path inside the dust collector 100 by a suction force generated by the suction unit, and the foreign matter is separated from the air by the structure of the dust collector 100 during the flow.

An outer appearance of the dust collector 100 is formed by a housing 110, an upper cover 120, and a lower cover 130. The housing 110 forms a lateral appearance of the dust collector 100. The housing 110 is configured to receive the internal components of the dust collector 100, such as a cyclone 150, axial inlet type swirl tubes (or axial inlet type cyclones) 160 (see FIG. 4) and a mesh 170, which will be described below. The housing 110 may be formed in a cylindrical shape in which a top and a bottom thereof are open, but is not limited thereto.

The upper cover 120 is coupled to an upper portion of the housing 110. The upper cover 120 may be rotatably coupled to the housing 110 by a hinge 125. When it is required to open the upper cover 120 and clean an inside of the dust collector 100, the upper cover 120 may be rotated about the hinge 125 to open an upper opening of the housing 110.

An inlet 121 and an outlet 123 of the dust collector 100 may be respectively formed on the upper cover 120. Referring to FIG. 2, the inlet 121 of the dust collector 100 may be formed on one side of the upper cover 120, and the outlet 123 of the dust collector 100 may be formed on the other side of the upper cover 120.

The inlet 121 of the dust collector 100 is connected to the suction nozzle 20 by the connecting unit 30. Therefore, air and foreign matter introduced through the suction nozzle 20 flow into the dust collector 100 through the connecting unit 30. Furthermore, the outlet of the dust collector 100 is connected to an internal flow path of the cleaner body 10. Accordingly, the air separated from the foreign matter by the dust collector 100 passes through the suction nozzle 20 along the internal flow path of the cleaner body 10 and is discharged to an outside of the cleaner body 10.

The upper cover 120 may be formed with an intake guide 122 and an exhaust guide 124, respectively. The intake guide 122 is formed on a downstream side of the inlet 121 and connected to an inside of the dust collector 100. The intake guide 122 extends downward from the center of the upper cover 120 to an inner circumferential surface of the housing 110 along a spiral direction. Therefore, the air guided by the intake guide 122 flows in a tangential direction toward the inner circumferential surface of the housing 110. Accordingly, a swirling flow is naturally formed in the air flowing into an inside of the housing 110.

The exhaust guide 124 is formed around the intake guide 122. The intake guide 122 and the exhaust guide 124 are partitioned from each other by a structure of the upper cover 120. The exhaust guide 124 may have a structure in which two branched paths 124a, 124b formed at both sides of the intake guide 122 are integrated into one path, and the outlet 123 of the dust collector 100 is formed on a downstream side of the exhaust guide 124.

A first dust collection unit (or first dust collection chamber) 141 for collecting dust and a second dust collection unit (or second dust collection chamber) 142 for collecting fine dust are formed at an inner side of the housing 110. The first dust collection unit 141 and the second dust collection unit 142 are formed in a region defined by the housing 110, the lower cover 130, and the like.

The first dust collection unit 141 is formed in a ring shape at an inner side of the housing 110. The first dust collection unit 141 is formed to collect dust falling down in the cyclone 150, which will be described later. A partition plate 111 may be formed in the first dust collection unit 141. The partition plate 111 may protrude from an inner circumferential surface of the housing 110 toward a dust collection unit boundary 183.

The second dust collection unit 142 is formed in a region surrounded by the first dust collection unit 141. A cylindrically-shaped dust collection unit boundary 183 may be provided at an inner side of the housing 110 to partition the first dust collection unit 141 and the second dust collection unit 142. An outer side of the dust collecting boundary 183 corresponds to the first dust collection unit 141, and an inner side of the dust collection unit boundary 183 corresponds to the second dust collection unit 142. The second dust collection unit 142 is formed to collect fine dust falling from the axial inlet type swirl tubes 160 to be described later.

The lower cover 130 is coupled to a lower portion of the housing 110. The lower cover 130 forms the bottoms of the first dust collection unit 141 and the second dust collection unit 142. The lower cover 130 may be rotatably coupled to the housing 110 by a hinge 125. When required to open the lower cover 130 to discharge the dust collected in the first dust collection unit 141 and the fine dust collected in the second dust collection unit 142, a fastening between the upper cover 110 and the lower cover 130 is released to rotate the lower cover 130 about the hinge 125 so as to open a lower opening portion of the housing 110. The dust collected in the first dust collection unit 141 and the fine dust collected in the second dust collection unit 142 are discharged downward at a time by their respective weights.

The mesh 170 is provided at an inner side of the housing 110. The mesh 170 may be formed in a cylindrical shape having a smaller circumference than the housing 110. A plurality of holes 171 are formed on the mesh 170 and substances are filtered by the mesh 170 if they are larger in size than the holes 171 of the mesh 170.

A skirt 181 may be formed below the mesh 170. The skirt 181 may form a slope being closer to an inner surface of the housing 110 as it approaches the lower cover 130. The skirt 181 serves to prevent scattering of dust collected in the first dust collection unit 141.

Ribs 182 may protrude from an outer circumferential surface of the skirt 181 along a spiral direction. Ribs 182 induce a natural fall of the foreign matter filtered by the mesh 170 to collect the foreign matter in the first dust collection unit 141. Below the skirt 181, the dust collection unit boundary 183 described above is formed. The skirt 181, the ribs 182, and the dust collection unit boundary 183 may be formed as an integral member. The member may be referred to as an inner housing 180.

The cyclone 150 is formed at an inner side of the housing 110. Specifically, the cyclone 150 is formed by the housing 110 and the mesh 170. The cyclone 150 generates a swirling flow to separate dust from the air introduced into an inner side of the housing 110. When a suction force provided from the suction motor installed at an inner side of the cleaner body exerts an influence on an inner side of the dust collector 100, the air and the foreign matter swirl in the cyclone 150.

When a swirling flow is formed in the air and foreign matter sucked in a tangential direction of the cyclone 150 by the intake guide 122, relatively light air and fine dust flow into the mesh 170 through the hole of the mesh 170. On the contrary, relatively heavy dust flows along an inner surface of the housing 110 and falls to the first dust collection unit 141.

The axial inlet type swirl tubes 160 are provided at an inner side of a region defined by the mesh 170. Hereinafter, the structure of one axial inlet type swirl tube 160a will be described first, and subsequently the arrangement and operation of the axial inlet type swirl tubes 160 will be described.

Figure 4:
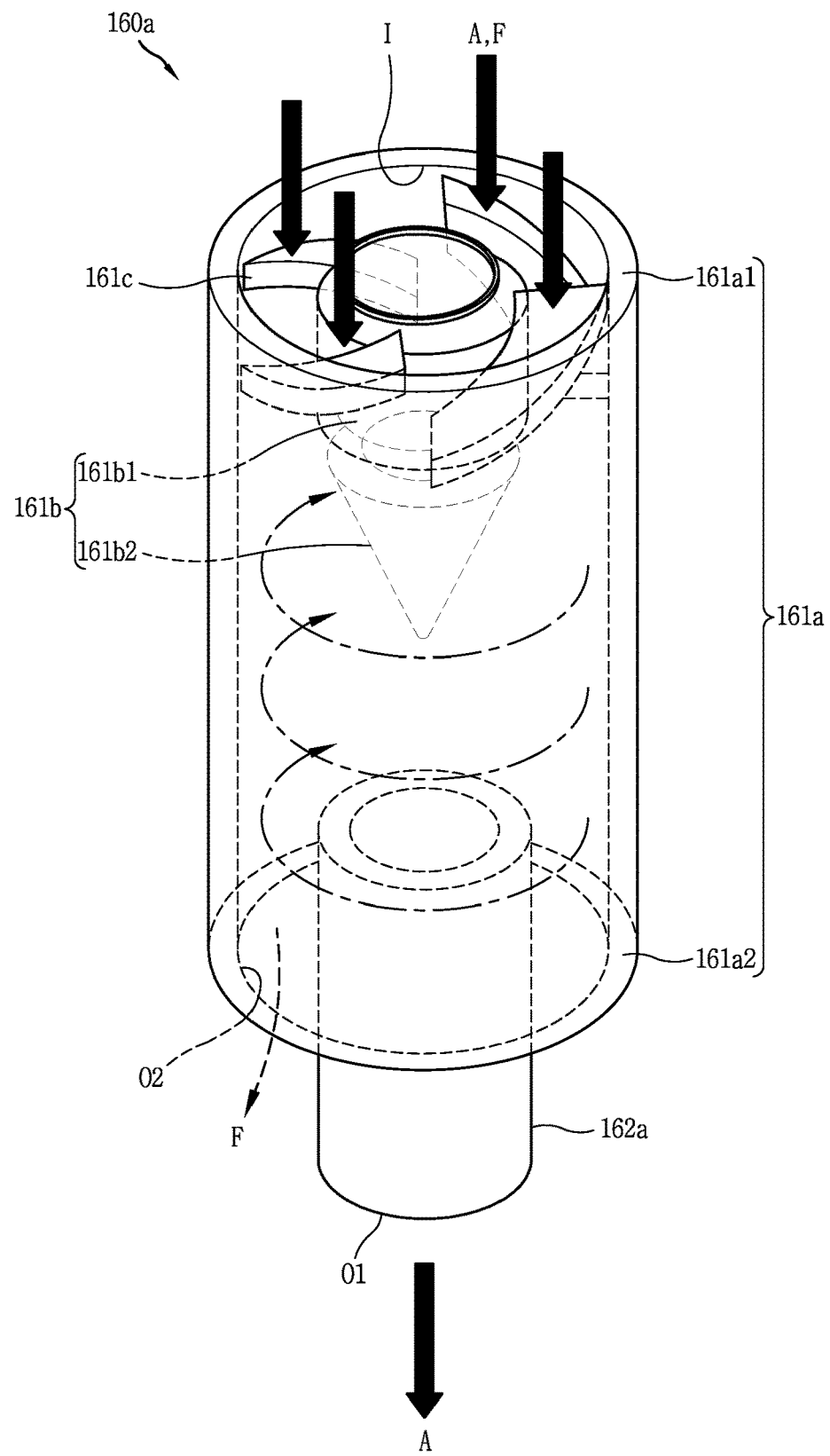
FIG. 4 is a perspective view of an axial inlet type swirl tube.

FIG. 4 is a perspective view of the axial inlet type swirl tube 160a. The axial inlet type swirl tube 160a is a concept included in a cyclone in a wide sense. The cyclone is divided into an axial inlet type and a tangential inlet type according to the inflow structure of air. In case of the axial inlet type cyclone, air is introduced along an axial direction of the cyclone, and in case of the tangential inlet type cyclone, air is introduced along a tangential direction of the cyclone.

The axial inlet type cyclone is divided into a cone type and a tube type according to the structure. The cone type has a structure in which the inner diameter gradually decreases in size, while the tube type has a structure in which the inner diameter is constant in size.

The cone type may have only a reverse flow structure, while the tube type may selectively have either one of a reverse direction and a forward flow structure. The reverse flow structure refers to a structure in which an inlet of air and an outlet of air are open in the same direction in such a manner that air introduced into the inlet of air reverses the flow direction and is discharged to the outlet of air. In contrast, the forward flow structure refers to a structure in which the inlet of air and the outlet of air are open in directions opposite to each other, and air introduced into the inlet of air is discharged to the outlet of air while maintaining the flow direction.

The axial inlet type swirl tube 160a of the present disclosure corresponds to an axial inlet type and a tube type, and has a forward flow structure. The axial inlet type swirl tube 160a is supplied with air and fine dust that have passed through the cyclone 150 and the mesh 170. Furthermore, the axial inlet type swirl tube causes a swirling flow to separate the fine dust from the air.

The axial inlet type swirl tube 160a receives the air (A) and the fine dust (F) along an axial direction. The axial direction refers to a direction extending toward the inlet (I) and the outlets (O1, O2) of the axial inlet type swirl tube 160a. When the air and the fine dust are supplied along an axial direction, the flow may be uniformly and symmetrically formed at 360° (degrees), thereby preventing the occurrence of a phenomenon of concentration of the flow in one region. The axial inlet type swirl tube 160a includes a body 161a, a vortex finder 161b, a vane 161c, and an outlet partition portion (or outlet partition) 162a.

The body 161a forms an appearance of the axial inlet type swirl tube 160a and forms a boundary between an inner side and an outer side of the axial inlet type swirl tube 160a. The body 161a is formed in a hollow cylindrical shape, and an inner diameter of the body 161a is constant. One side (upper or inlet side) 161a1 and the other side (lower or outlet side) 161a2 of the body 161a are open. Referring to FIG. 4, the open upper portion 161a1 corresponds to the inlet (I) of the body 161a and the open lower portion 161a2 corresponds to the outlets (O1, O2) of the body 161a. Therefore, the inlet (I) and the outlets (O1, O2) of the body 161a are open toward directions opposite to each other.

A vortex finder 161b is provided on an inlet side 161a1 of the body 161a. The vortex finder 161b includes a first portion 161b1 and a second portion 161b2. The first portion 161b1 is formed in a cylindrical shape. Furthermore, the second portion 161b2 protrudes from the first portion 161b1 toward the outlets (O1, O2) of the body 161a, and has a cone shape.

The second portion 161b2 of the axial inlet type swirl tube 160a is clogged or not open to receive an air flow. Therefore, air is not discharged to an inside of the vortex finder 161b. Since the air is not discharged to an inside of the vortex finder 161b, the air does not change the flow direction inside the body 161a.

The vane 161c is formed between an outer circumferential surface of the first portion 161b1 and an inner circumferential surface of the body 161a. There may be provided with a plurality of vanes 161c, and the plurality of vanes 161c extend in a spiral direction. The vortex finder 161b and the vane 161c form a swirling flow of air and fine dust between an outer circumferential surface of the vortex finder 161b and an inner circumferential surface of the body 161a.

The outlets (O1, O2) of the axial inlet type swirl tube 160a include an air outlet (O1) and a fine dust outlet (O2). The air outlet (O1) and the fine dust outlet (O2) are open toward the same direction (the outlet side 161a2 of the body 161a). The outlet partition portion 162a is provided on the outlet side 161a2 of the body 161a and formed to partition the air outlet (O1) and the fine dust outlet (O2).

Referring to FIG. 4, the fine dust outlet (O2) is formed in a ring shape around the air outlet (O1). An inner region defined by the outlet partition portion 162a corresponds to the air outlet (O1). Furthermore, a region between an outer circumferential surface of the outlet partition portion 162a and an inner circumferential surface of the body 161a corresponds to the fine dust outlet (O2). The outlet partition portion 162a is formed in a cylindrical shape and defines the air outlet (O1) and the fine dust outlet (O2).

Referring to FIG. 4, the body 161a and the vortex finder 161b may be connected to each other by a vane 161c. Therefore, the body 161a, the vortex finder 161b, and the vane 161c may be formed by one member, and this one member may be referred to as a first member 161. On the other hand, the outlet partitioning portion 162a is spaced apart from the body 161a. Therefore, the outlet partition portion 162a is formed by a separate member, and the separate member may be referred to as a second member 162. The axial inlet type swirl tubes 160 are formed by an engagement of the first member 161 and the second member 162.

Figure 5:
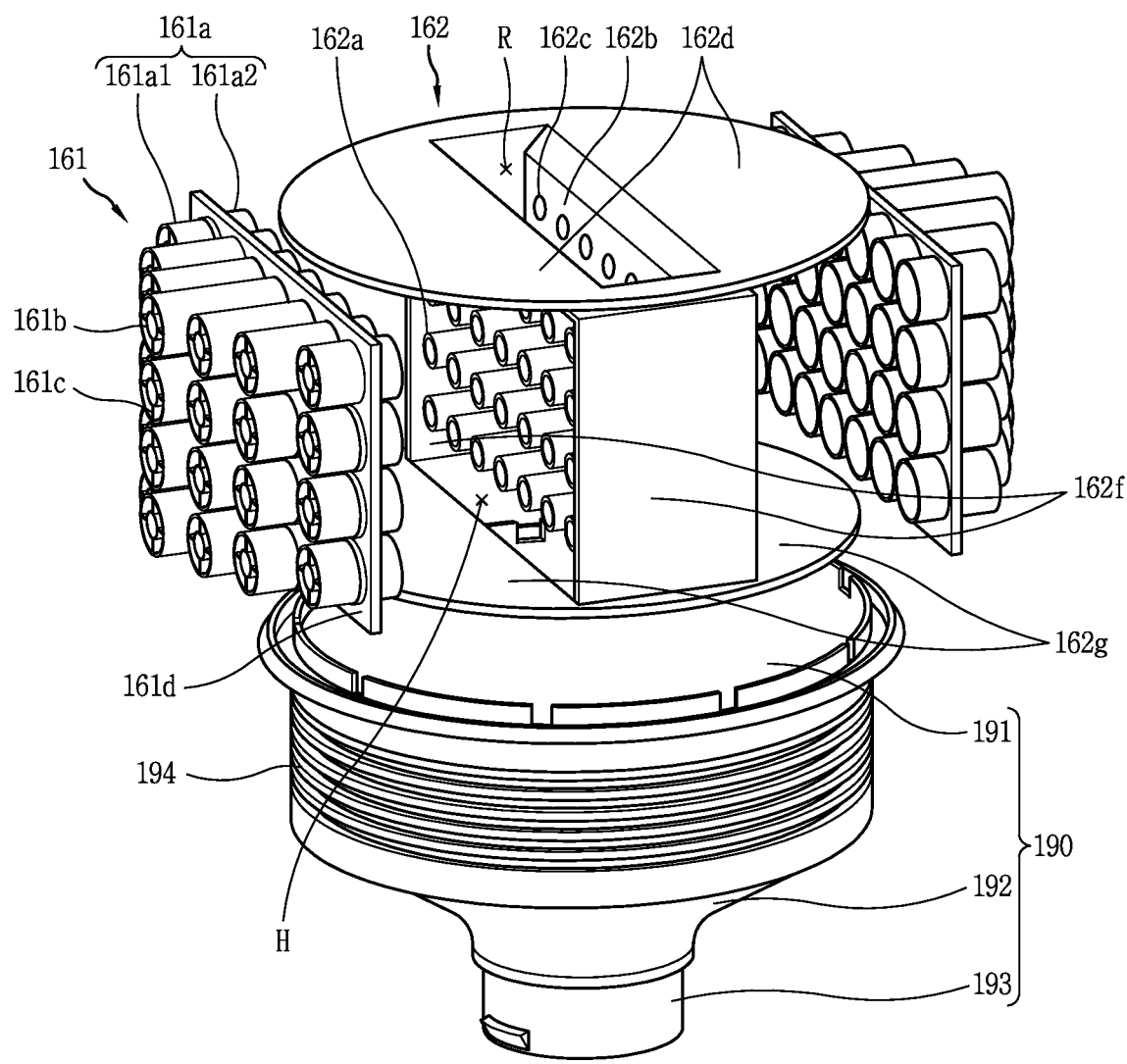
FIG. 5 is an exploded perspective view illustrating an internal structure of the dust collector illustrated in FIG. 2.

Hereinafter, a coupling structure of the first member 161 and the second member 162 will be described. FIG. 5 is an exploded perspective view illustrating an internal structure of the dust collector 100 illustrated in FIG. 2.

The dust collector 100 includes a plurality of axial inlet type swirl tubes 160. The axial inlet type swirl tubes 160 may be formed by an engagement of the first member 161 and the second member 162. There may be provided with a plurality of first members 161, and there may be provided with a single second member 162.

The first member 161 includes a curved or planar body base (or body base surface) 161d. The body 161a of the axial inlet type swirl tube protrudes to both sides of the body base 161d. The inlet side 161a1 of the body 161a protrudes from one side of the body base 161d and the outlet side 161a2 of the body 161a protrudes from the other side of the body base 161d. The inlet side 161a1 and the outlet side 161a2 of the body 161a are divided based on the body base 161d.

Two first members 161 may be provided. Referring to FIG. 5, any one first member 161 is provided on one side of the second member 162, and another first member 161 is provided on the other side of the second member 162. The two first members 161 may have the same shape.

As the two first members 161 are provided therein, the axial inlet type swirl tubes 160 are arranged in two columns. A first column 160' and a second column 160" are provided toward directions opposite to each other.

One body base 161d and a plurality of bodies 161a may be formed for each first member 161. Furthermore, a plurality of bodies 161a may be stacked in multiple stages (or rows) for each first member 161, and a plurality of bodies 161a may be formed for each stage. In FIG. 5, it is shown that the bodies 161a are stacked in four stages for each first member 161, and seven bodies 161a are formed for each stage. In addition, the vortex finder 161b and the vane 161c are formed on an inner side of each body 161a.

An axial length of the body 161a arranged at each end is not constant but varies depending on the position. Referring to FIG. 5, the axial length of the body 161a gradually increases as it approaches the body 161a provided at the center of each stage. Here, the axial length of the body 161a denotes a distance between the inlet and the outlet. The axial length of the body 161a corresponds to an axial length of the axial swirl tube 160.

The length of the body 161a has an effect on the separation performance of the axial inlet type swirl tube 160. As the length of the body 161a increases, the separation performance of the axial inlet type swirl tube 160 increases. Therefore, it is preferable to have an increased length of the body 161a.

However, since the size and shape of the housing 110 are limited, the length of the body 161a cannot be infinitely increased. In particular, since the shape of the housing 110 is cylindrical, the axial length of the body 161a may be gradually increased as it approaches the axial inlet type swirl tube 160 provided at the center of each stage.

The occurrence of a dead zone in the housing 110 may be suppressed when the length of the body 161a gradually increases as it approaches the axial inlet type swirl tube 160 provided at the center of each stage. In addition, the separation performance of the axial inlet type swirl tube 160 may be maximized within a limited size and shape of the housing 110. Here, the dead zone denotes a wasted space that does not contribute to improving the separation performance of the axial inlet type swirl tube 160 through an increase in the axial length of the body 161a.

The second member 162 includes an outlet base 162b, an air vent hole 162c, an outlet partition portion (or outlet partition) 162a, an upper block portion (or upper block surface) 162d, a sidewall 162f, and a second dust collection unit top cover (or second cyclone top cover) 162g.

The outlet base 162b has a curved surface or a flat surface. The outlet base 162b corresponds to a lateral surface of the cylindrical or polygonal pillar. Referring to FIG. 5, it is shown a configuration in which the outlet base 162b corresponds to a lateral surface of a rectangular pillar.

The outlet base 162b of the second member 162 is provided in the same number as that of a column of axial inlet type swirl tubes 160. For example, FIG. 5 illustrates a configuration in which two outlet bases 162b are provided so as to correspond to two columns of axial inlet type swirl tubes 160.

Figure 6:
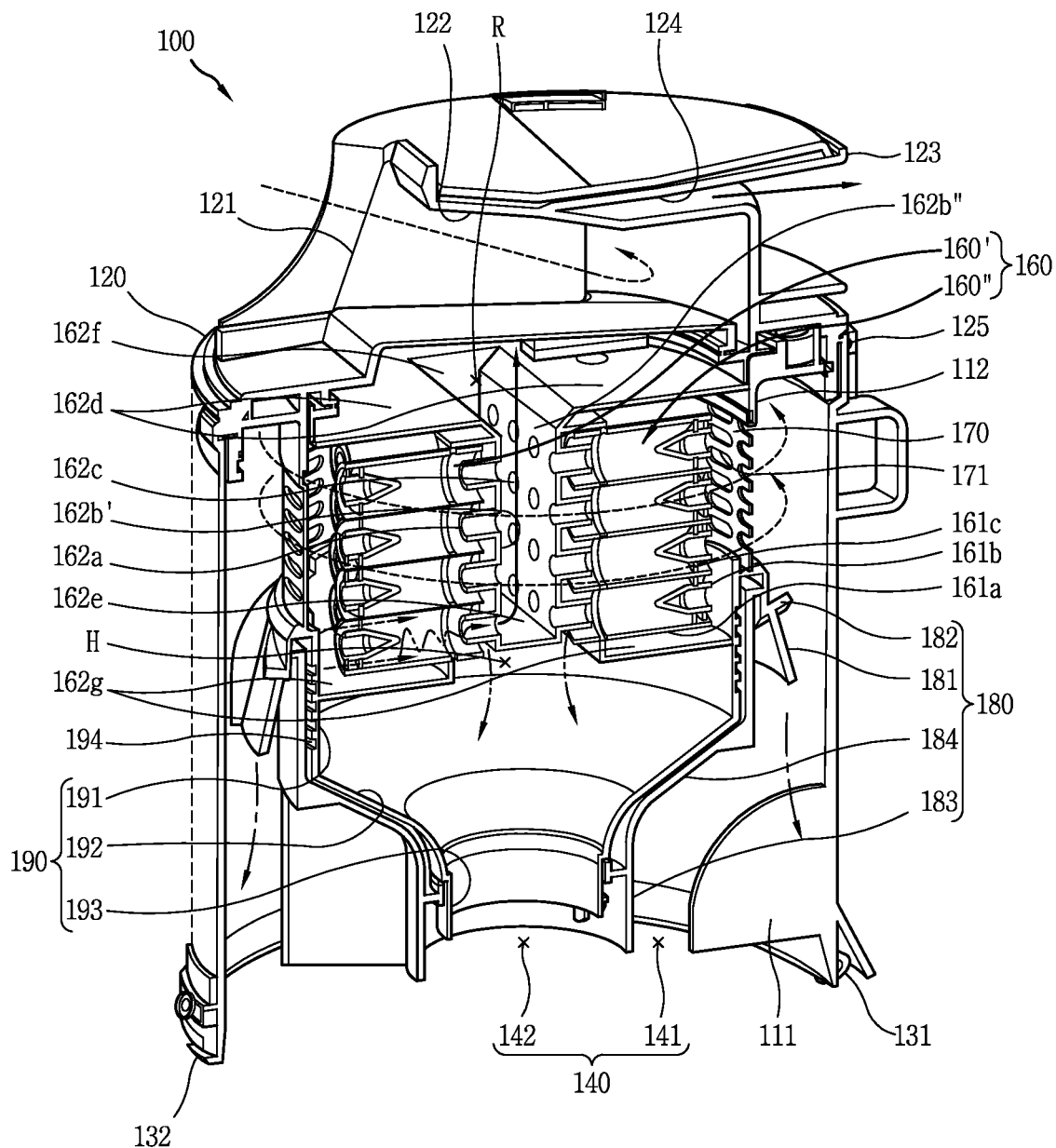
FIG. 6 is a cross-sectional view in which the dust collector illustrated in FIG. 2 is cut along line A-A and seen from one side.

Of them, an outlet base forming a first column 160' of the axial inlet type swirl tubes is referred to as a first outlet base 162b' (see FIG. 6), and an outlet base forming a second column 160" of the axial inlet type swirl tubes is referred to as a second outlet base 162b" (see FIG. 6). The first outlet base 162b' and the second outlet base 162b" are arranged to face each other at positions spaced apart from each other.

The sidewalls 162f together with the outlet bases 162b form the remaining sides of the polygonal pillar. Two sidewalls 162f are provided in a similar manner to that of the outlet base 162b. The two side walls 162f are arranged to face each other at positions spaced apart from each other. Referring to FIG. 5, it is shown a configuration in which the sides of a rectangular pillar are formed by the two sidewalls 162f and the two outlet bases 162b.

In a region surrounded by the two outlet bases 162b and the two sidewalls 162f, a rising flow path (R) of air discharged from the axial inlet type swirl tubes 160 is formed. The air discharged from the axial inlet type swirl tubes 160 is collected into the rising flow path (R) at the center of the second member 162. The rising flow path (R) leads to an outlet 123 of the dust collector 100 formed on an upper side of the housing 110. Therefore, the air is moved upward by a suction force of the suction motor, and discharged to the outlet 123 of the dust collector 100 along the exhaust guide 124.

The air outlet holes 162c are formed in each outlet base 162b. The air vent holes 162c are formed in the same number as that of the axial inlet type swirl tubes 160. Furthermore, the air vent holes 162c have the same arrangement as that of the bodies 161a. For example, the air vent holes 162c may be stacked in multiple stages, and a plurality of air vent holes 162c may be formed in each stage.

The outlet partition portion 162a protrudes from the circumference of each air vent hole 162c toward an inside of the body 161a. Since the air vent hole 162c is formed in the outlet base 162b, it may be understood that the outlet partition portion 162a protrudes from the outlet base 162b. The outlet compartments 162a have the same arrangement as that of the bodies 161a similarly to the air vent holes 162c.

The upper block portions 162d may be formed on one side and the other side of the rising flow path, respectively. One of the two upper block portions 162d is formed at an upper end of the first outlet base 162b' and the other one is formed at an upper end of the second outlet base 162b". The two upper block portions 162d may have a shape symmetrical to each other.

The upper block portion 162d is provided to face the second dust collection unit top cover 162g at a spaced apart position. The upper block portion 162d and the second dust collection unit top cover 162g may have a substantially symmetrical shape.

The second dust collection unit top cover 162g is formed at a lower end of the side wall 162f. Two second dust collector top covers 162g are provided, and each of the second dust collector top covers 162g has a circular segment shape. When the second frame 162 is inserted into a support member 190 which will be described later, the second dust collection unit top cover 163g comes into contact with the support member 190 along an inner circumferential surface of the support member 190. The second dust collection unit top cover 162g partitions an inlet side of the axial inlet type swirl tubes 160 from the second dust collection unit 142 and prevents scattering of fine dust collected in the second dust collection unit 142.

A hole (H) for falling fine dust discharged from the fine dust outlet (O2) (see FIG. 7) of the axial inlet type swirl tubes 160 is formed between the two second dust collection unit top covers 162g. The air and the fine dust introduced into the axial inlet type swirl tubes 160 are swirled inside the axial inlet type swirl tubes 160, and separated from each other. The air is discharged through the air outlet (O1) (see FIG. 7), and the fine dust is discharged through the fine dust outlet (O2). The fine dust discharged through the fine dust outlet (O2) falls through the hole (H) to be collected in the second dust collection unit 142.

When the two first members 161 are coupled to the second member 162, the axial inlet type swirl tubes 160 are formed. The two first members 161 are coupled to the second member 162 in opposite directions to each other.

When the first member 161 is coupled to the second member 162, a rim of the body base 161d is brought into close contact with the side wall 162f. The body base 161d is formed in a planar or curved surface, and thus when the rim of the body base 161d is brought into close contact with the sidewall 162f, an open region between the two sidewalls 162f (a region where the outlet partition portions are formed) may be sealed. As an open area between the two sidewalls 162f is sealed, it may possible to prevent the fine dust discharged from the fine dust outlet (O2) of the axial inlet type swirl tubes 160 from being leaked.

The axial inlet type swirl tubes 160 may be supported by a support member (or support) 190. The support member 190 may be formed to receive a lower end of the axial inlet type swirl tubes 160. The support member 190 includes a receiving portion 191, an inclined portion 192, and a dust collecting guide 193. A sealing member 194 may be coupled to an outer circumferential surface of the support member 190. Each configuration of the support member 190 will be described later with reference to FIG. 6.

FIG. 6 is a cross-sectional view in which the dust collector 100 illustrated in FIG. 2 is cut along line A-A and seen from one side. When the two first members 161 are coupled to the second member 162 in different directions, at least part of each of the outlet partition portions 162a protruding from the outlet base 162b is inserted into an outlet side of each body 161a. As a result, the axial inlet type swirl tubes 160 are formed. The axial inlet type swirl tubes 160 are stacked in multiple stages.

The second member 162 further includes a lower block portion (or lower block surface) 162e. When the outlet base 162b of the second member 162 corresponds to a lateral surface of a cylindrical or polygonal pillar, the lower block portion 162e corresponds to a bottom side of the cylindrical or polygonal pillar. An upper surface of the cylindrical or polygonal pillar is open to discharge air through the rising flow path (R).

The lower block portion 162e partitions the rising flow path (R) and the second dust collection unit 142 to block a suction force generated by the suction motor from reaching fine dust collected in the second dust collection unit 142. Accordingly, the lower block portion 162e prevents the fine dust collected in the second dust collection portion 142 from being scattered to the rising flow path (R) of the air.

If there is no lower block portion 162e, fine dust discharged from the fine dust outlet (O2) of the axial inlet type swirl tubes 160 is moved upward along the rising flow path without being collected by the second dust collection unit 142 to be mixed with the air again. It is because the hole (H) for falling fine dust is formed directly below the lower block portion 162e.

The upper block portion 162d extends toward a circumferential direction from an upper end of the outlet base 162b. Since the fine dust outlet (O2) of each axial inlet type swirl tube is formed around the air outlet (O1), the fine dust is discharged through the circumference of the air outlet (O1). However, a remaining region excluding the fine dust falling flow paths (D1, D2) which will be described later is blocked by the outlet base 162b and the upper block portion 162d. Accordingly, the upper block portion 162d prevents the mixing of fine dust and air discharged from the axial inlet type swirl tubes 160.

Referring to FIG. 6, a mesh 170 is provided in an inner region of the housing 110. The mesh 170 surrounds an outside of the axial inlet type swirl tubes 160 to form a boundary between the cyclone 150 and the axial inlet type swirl tubes 160. The axial inlet type swirl tubes 160 are provided in an inner region of the mesh 170. Furthermore, the rising flow path (R) of air is formed in a region between a first column 160' of the axial inlet type swirl tubes 160 and a second column 160" of the axial inlet type swirl tubes 160.

In order to support the mesh 170, the dust collector 100 may further include a mesh support portion 112. The mesh support portion 112 has a circumference corresponding to a circumference of the mesh 170, and is formed to surround an upper rim of the mesh 170. The mesh support portion 112 may be formed integrally with the housing 110, but is not necessarily limited thereto.

The upper block portion 162d of the second member 162 described above is provided around the rising flow path (R) to have a circular segment shape. The upper block portion 162d may be brought into close contact with an inner circumferential surface of the mesh support portion 112. Therefore, the upper block portion 162d partitions the exhaust guide 124, which is a downstream side of the rising flow path (R), and the inlet (I) (see FIG. 7) of the axial inlet type swirl tube 160. The upper block portion 162d may prevent the mutual mixing of air discharged to the exhaust guide 124 through the rising flow path (R) and air introduced into the axial swirl tubes 160.

A pre-filter (not shown) may be provided at an upper end of the upper block portion 162d. The pre-filter may be formed to filter ultra-fine dust from the air discharged through the rising flow path (R). The pre-filter is referred to as a pre-filter because it is provided at an upstream side of the suction motor on the basis of the flow of air.

Hereinafter, the process of separating air and foreign matter will be described. The air and the foreign matter are sequentially passed through the suction nozzle 20 and the connecting unit 30 by a suction force generated by the suction motor of the vacuum cleaner 1, and introduced into the dust collector 100 through the inlet of the dust collector 100.

The air introduced into the dust collector 100 swirls inside the housing 110. A centrifugal force of dust that is heavier than air is larger than that of the air. Accordingly, the dust swirls along an inner circumferential surface of the housing 110 and then the dust falls and is collected in the first dust collection unit 141.

The air flows through the mesh 170 into the axial inlet type swirl tubes 160 and swirls inside the body 161a by the guide vanes 161c. A centrifugal force of fine dust that is heavier than air is larger than that of the air. Therefore, the fine dust swirls along an inner circumferential surface of the body 161a, and then is discharged to the fine dust outlet (O2), and falls along the fine dust falling flow paths (D1, D2) (see FIG. 7), and is collected in the second dust collection portion 142. The air is discharged to the air outlet (O1) and then discharged to an outside of the dust collector 100 while sequentially passing through the rising flow path (R), the exhaust guide 124 and the outlet 123 of the dust collector 100.

The support member 190 includes a receiving portion (or receiving surface) 191, an inclined portion (or inclined surface) 192, and a dust collecting guide (or a dust collecting guide surface) 193. The receiving portion 191 corresponds to an uppermost portion of the support member 190 and the dust collecting guide 193 corresponds to the lowermost portion of the support member 190. The inclined portion 192 is formed between the receiving portion 191 and the dust collecting guide 193. The receiving portion 191 and the dust collecting guide 193 are formed in a cylindrical shape, and the receiving portion 191 has a larger cross-sectional area than the dust collecting guide 193.

The receiving portion 191 is formed so as to surround a lower end of the axial inlet type swirl tubes 160. However, an inner circumferential surface of the receiving portion 191 must be spaced from the inlet (I) of the axial inlet type swirl tubes 160 so as not to block a flow path of the air and the fine dust flowing into the axial inlet type swirl tubes 160.

The inclined portion 192 is formed in an inclined manner such that the cross-sectional area gradually decreases toward the bottom of the support member 190. Accordingly, the fine dust discharged from the axial inlet type swirl tubes 160 flows down smoothly along the inclined portion 192.

The dust collecting guide 193 protrudes from the inclined portion 192 toward the lower cover 130, and is inserted into the dust collection unit boundary 183. Accordingly, the fine dust discharged from the axial inlet type swirl tubes 160 is guided to the second dust collection unit 142 by the dust collecting guide 193.

The mesh 170 may be mounted at an upper end of the inner housing 180. The inner housing 180 is formed to surround the support member 190. The foregoing skirt 181 is formed at an upper portion of the inner housing 180. Furthermore, the dust collecting boundary 183 is formed at a lower portion of the inner housing 180. The dust collection unit boundary 183 is brought into close contact with the lower cover 130 to partition the dust collection unit 140 into a first dust collection unit 141 and a second dust collection unit 142. A mounting portion 184 for mounting the support member 190 is formed between the skirt 181 and the dust collection unit boundary 183. The mounting portion 184 may be formed to be inclined in the same manner as the inclined portion 192 of the support member 190.

A ring-shaped sealing member (or ring-shaped sealing extension) 194 may be provided between an inner circumferential surface of the inner housing 180 and an outer circumferential surface of the support member 190. A plurality of sealing members 194 may be provided. When the support member 190 is inserted into the inner housing 180, the sealing member 194 seals between the inner housing 180 and the support member 190. Accordingly, it may be possible to prevent the leakage of fine dust collected in the second dust collection unit 142.

Figure 7:
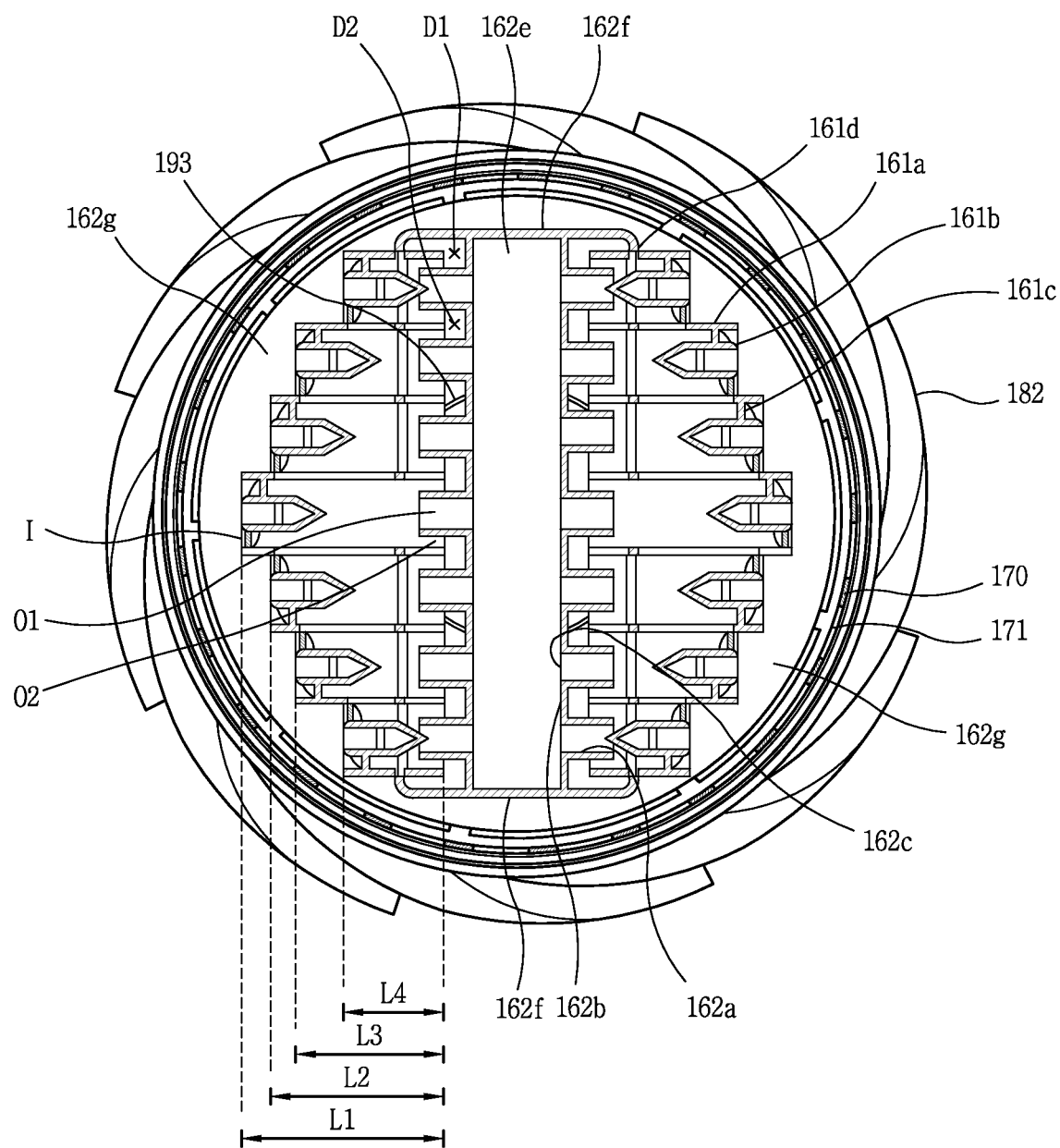
FIG. 7 is a cross-sectional view in which the dust collector illustrated in FIG. 2 is cut along line B-B and seen from the top.

FIG. 7 is a cross-sectional view in which the dust collector 100 illustrated in FIG. 2 is cut along line B-B and seen from the top. The axial inlet type swirl tubes 160 are stacked in multiple stages. Furthermore, the axial inlet type swirl tubes 160 in each stage are arranged radially. A first column 160" of the axial inlet type swirl tubes and a second column 160" of the axial inlet type swirl tubes are arranged toward directions opposite to each other. In FIG. 7, it is shown that the first column 160' of the axial inlet type swirl tubes are arranged toward the left, and the second column 160" of the axial inlet type swirl tubes are arranged toward the right. Since the rising flow path (R) of air is formed between the first column 160' of the axial inlet type swirl tubes and the second row 160" of the axial inlet type swirl tubes, the outlet of each of the axial inlet type swirl tubes 160 is arranged directly toward the rising flow path (R).

The outlet of the axial inlet type swirl tube belonging to the first column 160' may be provided to face the outlet of the axial inlet type swirl tube belonging to the second column 160". The same applies vice versa. Here, the outlet denotes an air vent hole 162c. It is because the axial inlet type swirl tubes 160 are arranged in two columns in opposite directions to each other.

An axial length of each of the axial inlet type swirl tubes may increase as it approaches the axial inlet type swirl tube provided at the center of each stage. Referring to FIG. 7, it may be seen that a length of the axial inlet type swirl tube provided at the center of each stage is L1, and the length of the axial inlet type swirl tube gradually decreases toward an outer side thereof (L1>L2>L3>L4). It has been described above that the occurrence of a dead zone can be suppressed through such a structure.

An end portion of the outlet side 161a2 of the body 161a and the outlet base 162b are spaced from each other to form fine dust falling flow paths (D1, D2) communicating with the second dust collection unit 142 therebetween. Since each end of the axial inlet type swirl tubes 160 has the same structure, the fine dust falling flow paths (D1, D2) extend downward toward the second dust collection unit 142.

The end portions of the outlet sides 161a2 of two bodies 161a provided adjacent to each other are arranged to be in contact with each other. Furthermore, an end portion of the respective outlet sides 161a2 of the two bodies 161a in contact with each other and the outlet base 162b are spaced from each other to form fine dust falling flow paths (D1, D2) therebetween. Accordingly, the air outlet (O1) and the fine dust falling flow paths (D1, D2) are alternately formed along the outlet base 162b.

As a number of the swirl inlet type swirl tubes 160 increases, and a length thereof increases, the separation performance for separating fine dust from air is improved, and therefore, it is preferable that the number of the axial inlet type swirl tubes 160 is large and the length thereof is long. However, since the number and length of the axial inlet type swirl tubes 160 cannot be increased indefinitely within a limited space, the number and length of the axial inlet type swirl tubes 160 must be maximized through an efficient arrangement thereof.

As illustrated in FIG. 7, when the axial inlet type swirl tubes 160 are stacked in multiple stages, the number of the axial inlet type swirl tubes 160 may be increased. In addition, when an axial length of each of the axial inlet type swirl tubes 160 is not constant and increases in proportion to a distance from the outlet of each of the axial inlet type swirl tubes to the housing 110, an average length of the axial inlet type swirl tubes 160 may further increase.

Furthermore, in order to suppress the flow loss (pressure loss) of air, a flow direction change of the air must be minimized. The pressure loss of the air has an effect on the performance of the dust collector 100. As illustrated in FIG. 7, when the axial inlet type swirl tubes 160 are arranged at the same height as the mesh 170 and arranged in two columns so that the inlet of each axial inlet type swirl tube faces the mesh 170, air that has passed through the cyclone 150 and the mesh 170 is directly introduced into the axial inlet type swirl tube without changing the flow direction.

In addition, since the axial inlet type swirl tube has the inlet and the outlet formed opposite to each other, unlike the cyclone 150, air introduced through the inlet of the axial inlet type swirl tube is directly discharged to the outlet without changing the flow direction. Therefore, the pressure loss of the air may be suppressed through the structure and arrangement of the axial inlet type swirl tube.

The configurations and methods according to the above-described embodiments will not be limited to the foregoing dust collector and cleaner, and all or part of each embodiment may be selectively combined and configured to make various modifications thereto.

According to the present disclosure having the foregoing configuration, the axial inlet type swirl tube has a forward direct inlet structure and a forward direct outlet structure. For example, since the inlet of the axial inlet type cyclone is provided to face the mesh, air passing through the mesh immediately flows into the inlet of the axial inlet type swirl tube without changing the flow direction. Furthermore, since the inlet and the outlet of the axial inlet type swirl tube are formed on opposite sides to each other, air introduced through the inlet is discharged through the outlet without changing the flow direction.

The flow direction of the air does not change during the process of being introduced into and discharged from the axial inlet type swirl tube, and thus when using the structure and arrangement of the axial inlet type swirl tube proposed in the present disclosure, it may be possible to suppress the flow loss (pressure loss) of the air and improve the performance of the dust collector.

Furthermore, according to the present disclosure, since the axial inlet type swirl tubes are stacked in multiple stages, the number of the axial inlet type swirl tubes may be increased within a limited space. In particular, the axial inlet type swirl tube is advantageous for downsizing compared to the cyclone. Accordingly, an increase in the number of the multi-stage arrangements of the axial inlet type swirl tubes improves the separation performance of separating fine dust from air.

In addition, according to the present disclosure, the expansion of a space occupied by the axial inlet type swirl tubes may be suppressed through an optimal arrangement of the axial inlet type swirl tubes, thereby increasing the capacity of the dust collection unit for collecting dust.

An aspect of the present disclosure is to provide a cleaner having a structure capable of suppressing the flow loss of air by using a high-efficiency axial inlet type swirl tube. Another aspect of the present disclosure is to propose a structure capable of maximizing an efficiency of the axial inlet type swirl tube through an optimal arrangement of the axial inlet type swirl tube. In particular, the present disclosure is to present a structure of optimizing an arrangement and the like capable of improving the flow direction of air introduced into or discharged from the axial inlet type swirl tube, and increasing a number of the axial inlet type swirl tubes.

In order to accomplish the foregoing aspects of the present disclosure, a dust collector according to an embodiment of the present disclosure may include an axial inlet type swirl tube provided at a downstream side of a cyclone. The axial inlet type swirl tubes are stacked in multiple stages, and the axial inlet type swirl tubes in each stage are arranged in two columns such that the first and second columns are provided toward opposite directions to each other. Furthermore, an axial length of each axial inlet type swirl tube may increase as it approaches the axial inlet type swirl tube provided at the center of each stage.

The dust collector may include a cylindrical housing configured to form an outer appearance of the dust collector; a cyclone formed inside the housing to cause a swirling flow to separate dust from air introduced into the housing; and a mesh configured to surround an outside of the axial inlet type swirl tubes to form a boundary between the cyclone and the axial inlet type swirl tubes.

The axial inlet type swirl tubes may receive air and fine dust that have passed through the cyclone, and cause a swirling flow to separate the fine dust from the air. Each of the axial inlet type swirl tubes may include an inlet provided to face the mesh, and supplied with air and fine dust; and an air outlet and a fine dust outlet that are open toward the same direction, wherein the inlet is open toward a direction opposite to the air outlet and the fine dust outlet. The fine dust outlet may be formed in a ring shape around the air outlet.

Each of the axial inlet type swirl tubes may include a cylindrical body; a vortex finder provided on an inlet side of the body, and provided with a cylindrical first portion and a conical second portion protruded from the first portion toward an outlet side of the body; a vane formed between an outer circumferential surface of the first portion and an inner circumferential surface of the body, and extended in a spiral direction; and an outlet partition portion provided at an outlet side of the body, and formed in a cylindrical shape to partition the air outlet and the fine dust outlet formed around the air outlet.

The axial inlet type swirl tubes may be formed by a coupling between a first member and a second member, and the first member may form the body, the vortex finder and the vane of each axial inlet type swirl tube, and the second member may form the outlet partition portion of each axial inlet type swirl tube, and at least part of the outlet partition portion may be inserted into an outlet side of the body.

The first member may further include a curved or planar body base, and the body may be protruded to both sides of the body base, and the second member may further include an outlet base having a curved or planar surface, and the outlet base may be formed with a number of air vent holes corresponding to the axial inlet type swirl tubes, and the outlet partition portion may be protruded from a circumference of the air vent hole toward an inside of the body.

The outlet base may include a first outlet base and a second outlet base provided to face each other at positions spaced apart, and the second member may further include two sidewalls provided to face each other at positions spaced apart and configured to form the sides of a polygonal pillar along with the first outlet base and the second outlet base, and a rising flow path of air discharged from the axial inlet type swirl tubes may be formed in a region surrounded by the first outlet base, the second outlet base, and the two sidewalls, and the rising flow path may communicate with an outlet of the dust collector formed on an upper side of the housing.

The mesh may be provided in an inner region of the housing, and the axial inlet type swirl tubes may be provided in an inner region of the mesh, and the rising flow path may be formed between the first column and the second column.

The first member may be coupled to the second member, and a rim of the body base may be brought into close contact with the two sidewalls to seal an open region between the two sidewalls.

The dust collector may further include a first dust collection unit formed in a ring shape inside the housing, and formed to collect dust falling from the cyclone; and a second dust collection unit formed in a region surrounded by the first dust collection unit, and formed to collect fine dust falling from the axial inlet type swirl tubes, wherein the second member further comprises a lower block portion for partitioning the second dust collection unit and the rising flow path to prevent fine dust collected in the second dust collection unit from being scattered to the rising flow path, and the first outlet base and the second outlet base correspond to two opposing sides of a polygonal pillar, and the lower block portion corresponds to a bottom surface of the polygonal pillar.

The second member may include two second dust collection unit top covers, and the two second dust collection unit top covers may be formed at a lower end of the second member, and formed in a circular segment shape.

A hole for falling fine dust discharged from the fine dust outlet may be formed between the two second dust collection unit top covers. The hole for falling fine dust is formed below the lower block portion.

The dust collector may further include a mesh support portion formed to surround an upper rim of the mesh, and the second member may further include two upper block portions formed at an upper end of the first outlet base and an upper end of the second outlet base, respectively, and the two upper block portions may be formed in a circular segment shape, and brought into close contact with the mesh support portion.

The second member may further include a first outlet base and a second outlet base provided to face each other at positions spaced apart; two sidewalls provided to face each other at positions spaced apart, and configured to form the sides of a polygonal pillar along with the first outlet base and the second outlet base; a plurality of the outlet partition portions provided by a number of the axial inlet type swirl tubes, and protruded from the first outlet base and the second outlet base in opposite directions to each other; an upper block portion formed at an upper end of the first outlet base and an upper end of the second outlet base, respectively; and two second dust collection unit top covers having an circular segment shape and formed at a lower end of the second member.

Two first members may be provided therein, and the two first members are inserted toward the second member in opposite directions to each other and coupled to the second member.

The dust collector may further include a first dust collection unit formed in a ring shape inside the housing, and formed to collect dust falling from the cyclone; and a second dust collection unit formed in a region surrounded by the first dust collection unit, and formed to collect fine dust falling from the axial inlet type swirl tubes, wherein an end portion of the outlet side of the body and the outlet base are spaced apart from each other to form a fine dust falling flow path communicating with the second dust collection unit therebetween.

The body may be provided by a number of the axial inlet type swirl tubes, and end portions of the respective outlet sides of two bodies provided adjacent to each other may be arranged to be in contact with each other, and the end portions of the respective outlet sides of two bodies in contact with each other and the outlet base may be spaced from each other to form the fine dust falling flow path therebetween.

The air outlet and the fine dust falling flow path may be alternately formed along the outlet base. An axial length of each axial inlet type swirl tube may be proportional to a distance from the outlet of each axial inlet type swirl tube to the housing.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dust collector, comprising:
   a cylindrical housing configured to form an outer appearance of the dust collector;
   a cyclone provided inside the housing and configured to generate a first swirling flow to separate dust from air introduced into the housing;
   axial inlet type cyclones configured to receive air and fine dust that have passed through the cyclone, and to generate second swirling flows to separate the fine dust from the received air; and
   a mesh configured to surround the axial inlet type cyclones and to form a boundary between the cyclone and the axial inlet type cyclones,
   wherein:
   the axial inlet type cyclones are positioned in one or more first rows and one or more second rows,
   the axial inlet type cyclones in the first rows and second rows are stacked, respectively, into first columns and second columns such that the first and second columns are disposed in opposite directions to each other, and
   axial lengths of the axial inlet type swirl tubes gradually increase toward a center column of each of the first and second rows.

2. The dust collector of claim 1, wherein the axial inlet type cyclones include:
   inlets that open toward the mesh and to receive the air and the fine dust that have passed through the cyclone; and
   air outlets and fine dust outlets that are open toward respective same directions that is opposite to the inlets.

3. The dust collector of claim 2, wherein each of the fine dust outlets is formed in a ring shape around a respective one of the air outlet.

4. The dust collector of claim 2, wherein one of the axial inlet type cyclones includes:
   a body having a cylindrical shape;
   a vortex finder provided on an inlet side of the body, and is provided with a cylindrical first surface, and a conical second surface that extends from the first surface and toward an outlet side of the body;
   a vane formed between an outer circumferential surface of the first surface and an inner circumferential surface of the body, and that extends in a spiral direction; and
   an outlet partition provided at the outlet side of the body, and is formed in a cylindrical shape to partition the air outlet and the fine dust outlet.

5. The dust collector of claim 4, wherein:
   the axial inlet type cyclones are formed by a coupling a first member and a second member,
   the first member forms the body, the vortex finder and the vane of one or more of the axial inlet type cyclones,
   the second member forms the outlet partition of one or more of the axial inlet type cyclones, and
   at least part of the outlet partition is inserted into an outlet side of the body when coupling the first member and the second member.

6. The dust collector of claim 5, wherein the first member further includes a curved or planar body base surface,
   respective ends of the body that protrude from both sides of the body base,
   the second member further includes an outlet base having a curved or planar surface,
   the outlet base is formed with a quantity of air vent holes corresponding to a quantity of the axial inlet type cyclones formed through the first and second members, and
   the outlet partition protrudes from a circumference of the air vent hole toward an inside of the body.

7. The dust collector of claim 6, wherein the outlet base includes a first outlet base and a second outlet base that are provided to face each other and at positions that are spaced apart,
- the second member further includes two sidewalls provided to face each other and at positions that are spaced apart, and are configured to combine with the first outlet base and the second outlet base to form the sides of a polygonal pillar,
- a rising flow path of air discharged from the axial inlet type cyclones is formed in a region surrounded by the first outlet base, the second outlet base, and the two sidewalls, and
- the rising flow path communicates with an outlet of the dust collector formed on an upper side of the housing.

8. The dust collector of claim 7, wherein
the mesh is provided in an inner region of the housing,
the axial inlet type cyclones are provided in an inner region of the mesh, and
the rising flow path is formed between the first columns and the second columns.

9. The dust collector of claim 7, wherein
the first member is coupled to the second member, and
a rim of the body base surface is positioned adjacent to the two sidewalls to seal an open region between the two sidewalls.

10. The dust collector of claim 7, wherein the dust collector further comprises:
- a first dust collection chamber formed in a ring shape inside the housing, and configured to collect the dust from the cyclone;
- a second dust collection chamber formed in a region surrounded by the first dust collection chamber, and configured to collect the fine dust from the axial inlet type cyclones,
wherein
   - the second member further includes a lower block surface that partitions the second dust collection chamber and the rising flow path to block the fine dust collected in the second dust collection unit from being scattered to the rising flow path, and
   - the first outlet base and the second outlet base correspond to two opposing sides of a polygonal pillar, and the lower block surface corresponds to a bottom surface of the polygonal pillar.

11. The dust collector of claim 10, wherein the second member includes two second dust collection chamber top covers, and
the two second dust collection chamber top covers are formed at a lower end of the second member, and are formed in a circular segment shape.

12. The dust collector of claim 11, wherein a hole for the fine dust discharged from the fine dust outlets is formed between the two second dust collection chamber top covers.

13. The dust collector of claim 12, where the hole for the fine dust is formed below the lower block surface.

14. The dust collector of claim 7, wherein
the dust collector further comprises a mesh support formed to surround an upper rim of the mesh,
the second member further includes two upper block surface formed at an upper end of the first outlet base and an upper end of the second outlet base, respectively, and
the two upper block surface are formed in a circular segment shape, and are positioned adjacent to the mesh support.

15. The dust collector of claim 5, wherein the second member further includes:
- a first outlet base and a second outlet base provided to face each other and at positions that are spaced apart;
- two sidewalls provided to face each other and at positions that are spaced apart, and are configured to combine with the first outlet base and the second outlet base to form the sides of a polygonal pillar;
- a plurality of the outlet partitions provided, respectively, for the axial inlet type cyclones, and positioned to protrude from the first outlet base and the second outlet base in opposite directions;
- an upper block formed at an upper end of the first outlet base and an upper end of the second outlet base, respectively; and
- two second dust collection chamber top covers having an circular segment shape and formed at a lower end of the second member.

16. The dust collector of claim 5, wherein the dust collector comprises two first members, and the two first members are inserted toward the second member in opposite directions to each other to be coupled to the second member.

17. The dust collector of claim 5, wherein the dust collector further comprises:
- a first dust collection chamber formed in a ring shape inside the housing, and configured to collect the dust from the cyclone; and
- a second dust collection chamber formed in a region surrounded by the first dust collection chamber, and configured to collect the fine dust from the axial inlet type cyclones, and
wherein an end portion of the outlet side of the body and an outlet base of the second member are spaced apart from each other to form a fine dust falling flow path communicating with the second dust collection chamber.

18. The dust collector of claim 17, wherein
bodies are provided for the axial inlet type cyclones,
end portions of the respective outlet sides of two of the bodies provided adjacent to each other are positioned to be in contact with each other, and
the end portions of the respective outlet sides of two bodies in contact with each other and the outlet base are spaced from each other to form the fine dust falling flow path therebetween.

19. The dust collector of claim 17, wherein the air outlet and the fine dust falling flow path are alternately formed along the outlet base.

20. The dust collector of claim 1, wherein the axial lengths of the axial inlet type cyclones are proportional to respective distances from outlets of the axial inlet type cyclones to the housing.

* * * * *